Jan. 9, 1934.   H. G. KAMRATH   1,942,554
OIL FILTER PRESSURE CONTROL
Filed July 1, 1927   2 Sheets-Sheet 1
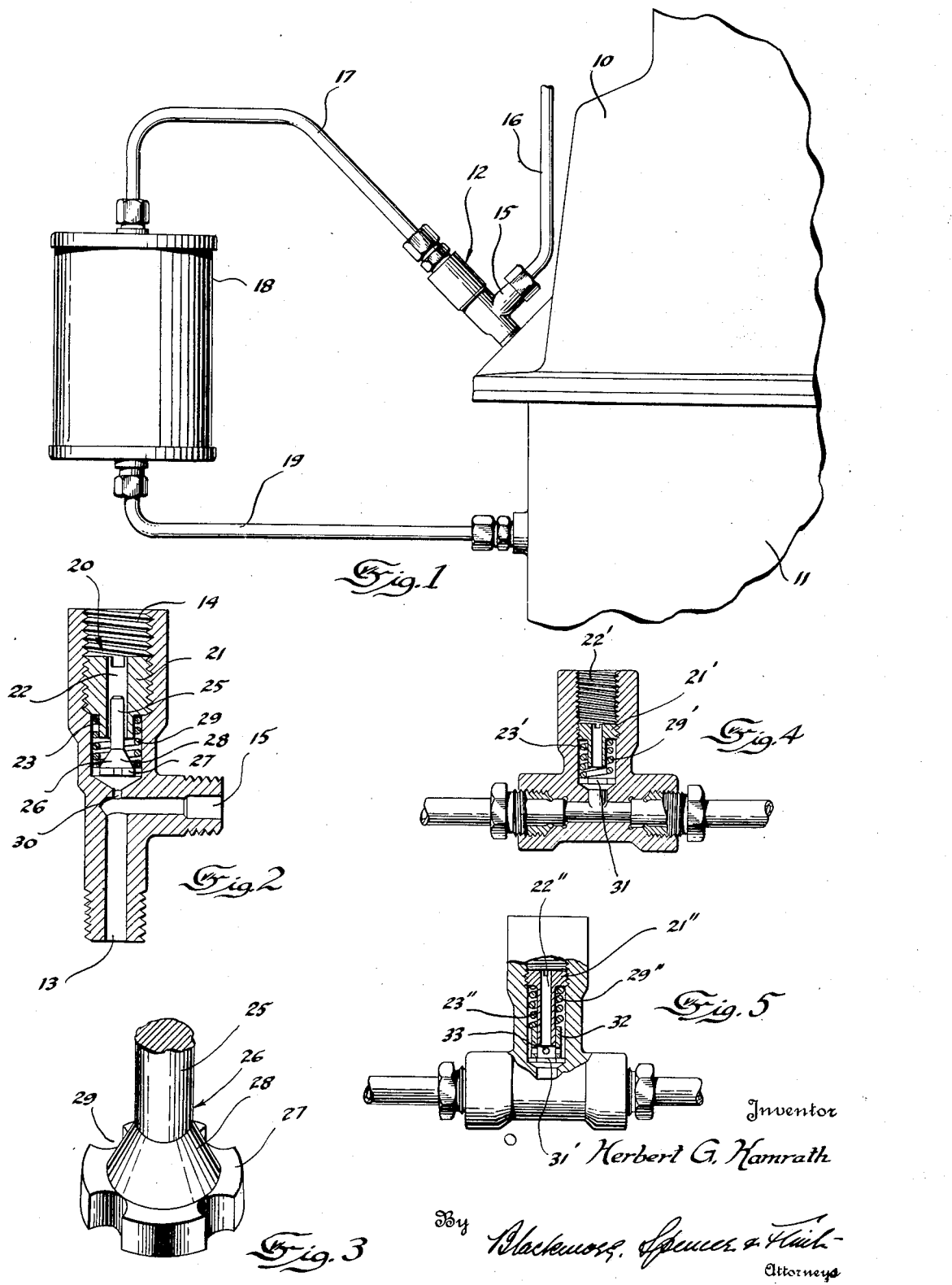
Inventor
Herbert G. Kamrath
By Blackmore, Spencer & Hail
Attorneys Jan. 9, 1934. H. G. KAMRATH 1,942,554
OIL FILTER PRESSURE CONTROL
Filed July 1, 1927 2 Sheets-Sheet 2

Inventor
Herbert G. Kamrath

Patented Jan. 9, 1934

1,942,554

UNITED STATES PATENT OFFICE 1,942,554

OIL FILTER PRESSURE CONTROL

Herbert G. Kamrath, Flint, Mich., assignor to A C Spark Plug Company, Flint, Mich., a company of Michigan Application July 1, 1927. Serial No. 202,909

2 Claims. (Cl. 184—6)

This invention relates to automotive vehicles and particularly to the location and structure of a flow control valve used in oil filtering systems.

In prior constructions, a bypass has been incorporated as a part of the filter can. It is the object of the present invention to construct a novel flow control valve and locate it at a point which may be readily accessible and will prevent the pressure on the filter exceeding a definite amount by stopping the flow of oil to the filter when the pressure exceeds a predetermined amount. This flow control structure is new and performs a new function, and one which is different from the function of the conventional bypass.

The object of the invention is accomplished by applying the flow control valve to the rear or side of the engine block and incorporating within the flow control valve structure a novel valve which will shut off the flow of oil only when the pressure within the system reaches a predetermined amount. The flow control valve may also be applied to the inlet of the filter.

The present invention relates to a flow control valve rather than a by-pass. A distinct difference should be made between a by-pass and flow control valve. A by-pass presupposes an additional connection between the inlet and outlet pipes of the filter; and a spring controlled valve and the by-pass are located in this additional connection. With a flow control valve, there is no additional connection, the flow control valve being located in the inlet pipe to the filter, either at the engine, in the middle of the pipe, or at the filter, as may be desired. A by-pass operates to divert the flow of oil from the filter to the outlet connection. The flow control valve acts to prevent the flow of oil to the filter when the pressure exceeds a given amount and consequently the pressure in the filter will not exceed a predetermined amount.

Regarding a clogged or plugged filter, experience has proved that substantially all clogged filters have a certain amount of flexibility, that is, some of the parts of the filter are not completely filled with sediment. These parts which have oil in them collapse when the engine stops and thus permit a slight flow of oil when the engine is starting. This slight flow of oil is sufficient to set the flow control valve, as it has been found that it will operate on a flow of two or three drops of oil when the pressure exceeds the predetermined amount. If the engine is cold and starting up, the initial movement of the oil is sufficient to set the valve provided the pressure is greater than that previously determined.

The invention is disclosed in the accompanying drawings in which:

Figure 1 shows the system as a whole applied to an internal combustion engine.

Figure 2 is an enlarged detailed sectional view of the flow control valve structure.

Figure 3 is a perspective view of the preferred form of valve.

Figures 4 and 5 are modified forms of flow control valve structures.

Figure 6:
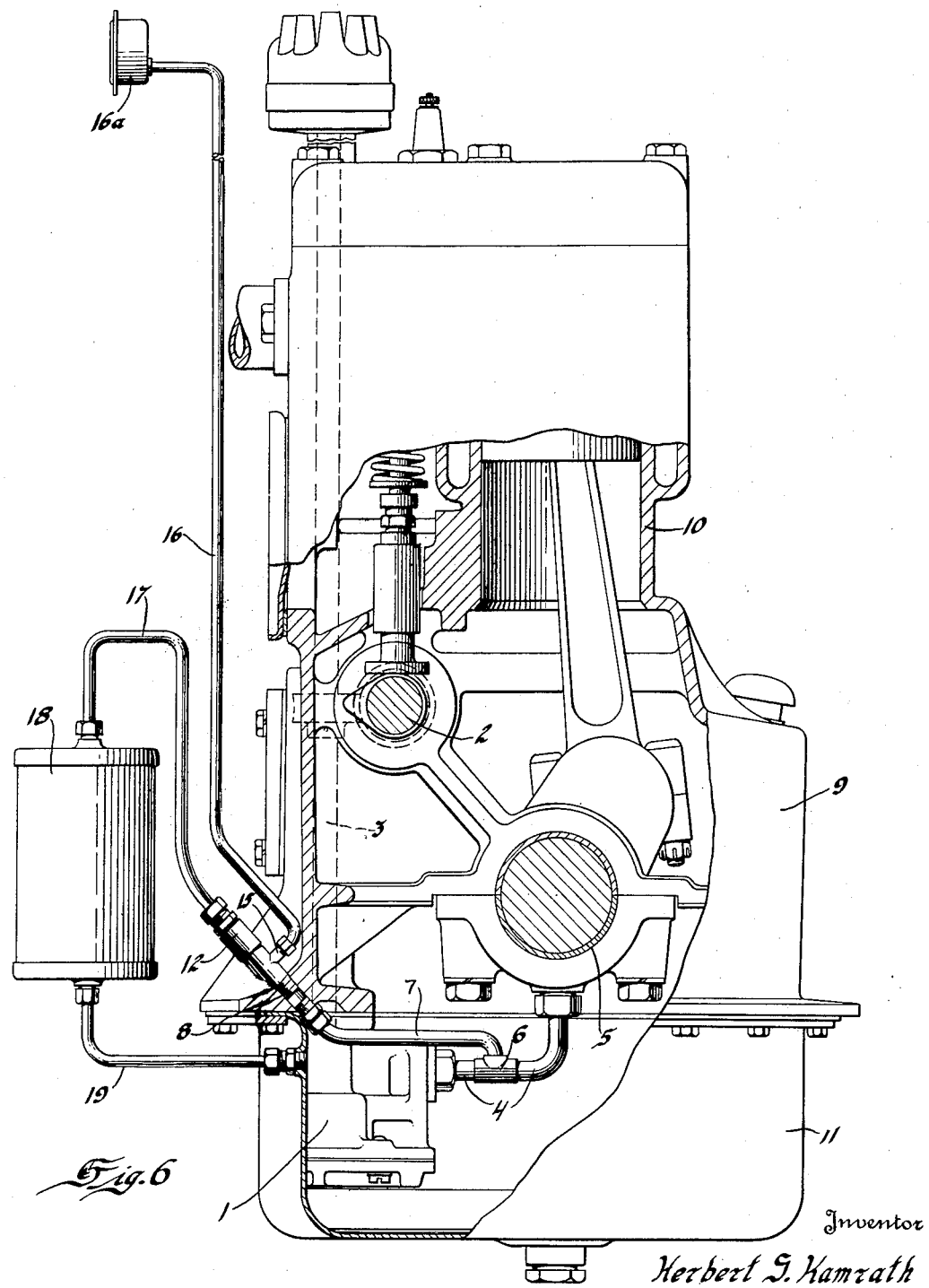
Figure 6 is a view showing the application of the invention to an internal combustion engine.

Referring to the numbered parts on the drawings, 10 indicates the engine block of an internal combustion engine 9 and 11 the oil pan thereof. My improved flow control valve is shown at 12 and is applied to an opening at the rear or side of the crankcase. In some engines, this opening is already at present being used for the oil pressure gauge but in instances where no such opening is found, it is easily applied.

Referring to Figure 6, it will be seen that my invention is shown as applied to an internal combustion engine. In this figure, 1 indicates the conventional oil pump having the usual pressure relief valve (not shown). The pump is driven from the camshaft 2 through the intermediary of the shaft 3 in a well known manner and draws its supply of oil from the oil pan 11. By means of a system of piping 4, the oil is delivered to the bearings 5. Within the piping 4 there is located a T connection 6, which has a pipe 7 connected thereto which pipe leads to the flow control valve 12 which is shown as threaded into an opening 8 in the crankcase. These parts per se are conventional and form no part of the invention except insofar as they relate to the combination.

The flow control valve has an inlet port 13 and an outlet port 14 and in the form shown in Figure 1, an auxiliary port 15 is provided to which is connected a pipe 16 leading to the oil gauge 16a. This auxiliary port 15 is not necessary and if desired, may be omitted.

Connected to the outlet port is a pipe or conduit 17 leading to an oil filter 18 having an outlet conduit or pipe 19 leading back to the oil pan 11.

Referring to the structure of Figure 2, it will be seen that in the outlet port 14 I have provided a valve structure 20 comprising a seat 21 threaded within the outlet port 14. This seat has a central bore 22 and an upstanding collar portion 23. Within the bore 22 there is received the stem 25 of the valve 26 which has a head 27 and a conical portion 28. The conical portion 28 is adapted to fit over the collar 23 of the seat 21 to form a liquid tight closure. The head 27 has a plurality of notches, grooves or cut-out portions 29, preferably four in number, through which the oil in the system normally flows. The valve 26 is held away from its seat on the collar 23 by means of a coil spring 29a.

The outlet port 14 is provided with a restriction 30 to limit the amount of flow of oil to the filter.

Under normal conditions, when the engine is running at a reasonable speed the notches or grooves 29 in the valve member 26 will be sufficient to allow the oil to pass to the filter through the bore 22 which, it will be noted, is considerably larger than the diameter of the stem 25. However, when the pressure in the system becomes excessive or if the oil is cold and thick, it will force the valve 26 away from the restriction and against the seat on the collar 23 thereby closing the bore 22, preventing the passage of oil and damage to the filter due to an excessive flow of oil or to an oil which is unusually thick. When the flow control valve is closed, all the oil will continue to flow to the bearings or other working parts in and about the engine, the pump pressure relief valve taking care of the excess pressure in the system.

Referring to the structure of Figure 4, the essential difference resides in the construction of the valve. It will be noted that the valve seat 21' has a central bore 22' and a collar 23' as in Figure 2. Instead of the valve member 26 of Figure 3 use is made of the polygonal disk 31 held in place by means of a spring 29' which rests against the shoulder of the seat member 21'. The oil normally flows past the space between the edges of the disk 31 and the bore of the outlet opening and through the bore 22'.

The operation of this species is similar to that of the species of Figure 2. When the pressure in the system becomes excessive or if the oil is cold and unusually thick, it will force the disk 31, against the pressure of the spring 29', over the opening in the bore 22' of the collar 23' thereby shutting off flow of oil to the filter.

The structure of Figure 5 differs from that of Figure 2 principally in the construction of the valve mechanism. This species has the valve seat 21'', the bore 22'' and the collar 23'' the latter of which is surrounded by the spring 29''. The spring 29' seats against the shoulder on the seat 21' and at its other end against the collar 32 slidable on the collar 23''. The collars 23'' and 32 have openings 33 which are normally in alignment. When the pressure in the system becomes excessive or if the oil is cold and thick, it will force the polygonal disk 31' upwardly as shown in Figure 5, to cause the collar 32 to slide over the collar 23'' and bring the openings 33 out of alignment. This will shut off the supply of oil to the filter.

I claim:

1. In a flow control construction for an oiling system, inlet and outlet ports for said flow control and a valve in one of said ports comprising a hollow stem, a sleeve over said stem, and a disk on said sleeve, said sleeve having openings to permit oil to flow through the stem, the operation of said valve closing said openings.

2. In a flow control construction, inlet and outlet ports for said flow control, a valve in one of said ports comprising a polygonal disk, the space between the edge faces and the port being normally open and forming flow means, a spring acting on said disk, and a hollow shank member secured in said port for supporting said spring.

HERBERT G. KAMRATH.